United States Patent [19]

Wellendorf

[11] 4,075,663
[45] Feb. 21, 1978

[54] METHOD FOR THE RASTERED REPRODUCTION OF HALF-TONE PICTURES PROVIDING CHANGES IN THE INDIVIDUAL PICTURE ELEMENTS DURING TRANSFER FROM AN ORIGINAL TO A REPRODUCTION

[75] Inventor: Klaus Wellendorf, Kitzeberg, near Kiel, Germany

[73] Assignee: Dr. -Ing. Rudolf Hell GmbH, Germany

[21] Appl. No.: 667,504

[22] Filed: Mar. 17, 1976

[30] Foreign Application Priority Data

Mar. 19, 1975 Germany .............................. 2511922
Sept. 16, 1975 Germany .............................. 2541138

[51] Int. Cl.² .............................................. H04N 1/06
[52] U.S. Cl. .................................... 358/283; 358/287; 358/298

[58] Field of Search ............... 358/283, 287, 260, 261, 358/298, 302, 78, 80

[56] References Cited

U.S. PATENT DOCUMENTS

| | | | |
|---|---|---|---|
| 3,878,559 | 4/1975 | Pugsley | 358/78 |
| 3,893,166 | 7/1975 | Pugsley | 358/80 |
| 3,944,726 | 3/1976 | Ito | 358/78 |

*Primary Examiner*—Robert L. Griffin
*Assistant Examiner*—Edward L. Coles
*Attorney, Agent, or Firm*—Hill, Gross, Simpson, Van Santen, Steadman, Chiara & Simpson

[57] ABSTRACT

A method and apparatus for reproducing half-tone pictures utilizing rastered scanning in which the change in the picture element units occur during the transfer from the original to the reproduction with the use of an electronically stored recording data and where the date can be changed in a selectable manner to increase or decrease the raster and or the scale of the reproduction.

15 Claims, 10 Drawing Figures

METHOD FOR THE RASTERED REPRODUCTION OF HALF-TONE PICTURES PROVIDING CHANGES IN THE INDIVIDUAL PICTURE ELEMENTS DURING TRANSFER FROM AN ORIGINAL TO A REPRODUCTION

BACKGROUND OF THE INVENTION

1. Field of the Invention

This invention relates in general to methods and apparatus for the transfer and reproduction of half-tone pictures utilizing rastered processes and in particular to a novel method and apparatus for breaking up the picture elements.

2. Description of the Prior Art

In conventional reproduction systems for transferring pictorial or written material, the pictorial or written material which is to be reproduced is attached to a plane or cylindrical surface. This is called setting up the system. The original to be reproduced is then optically-electrically scanned and the electrical values associated with each of the elements of the picture are determined for the purpose of preparing the printing matrixes as for example, in offset printing processes or for engraving printing rollers. If half-tone pictures are to be produced the dimensions of the original pictures rarely coincide with the desired size of the pictures to be reproduced. In this event, the original pictures are normally enlarged or reduced to the desired scale by the use of photographic processes.

Frequently the picture original is a transparent diapositive miniature or even microfilm taken from a storage archives.

Another reproduction technique of half-tone pictures which has been frequently used has been to obtain recording data of half-tone pictures not only at the time of reproduction by means of optically scanning the original, but to do this before the reproduction is to occur and store the electronic data from the scanning process in a suitable memory device so that they will be available for picture reproduction at a later date.

Thus, it is known to optically electrically scan a picture for the purpose of changing the scale, to quantize the scanned signals, to store them digitally and to read them from the memory at a different timing rate than that in which they were read into the memory. This allows an expansion or compression, in other words, an enlargement or reduction and such a system is described, for example, in U.S. Pat. No. 3,272,918. However, in such system, after the information is read out from the memory, the picture signals are again changed back into analog signals and are recorded as such, which means that no rastered reproduction results.

U.S. Pat. No. 3,688,033 discloses a method for setting rastered half-tone pictures (the original picture signals are digitized). Depending on the brightness of the scanned value of the original, the recorded data for the picture element configurations which were separately prepared and scanned for each tone value prior to scanning the original, are then recalled from a separate memory and recorded. The scanning of such picture element configurations on a true to scale picture element basis may be accomplished as described in U.S. Pat. Nos. 3,652,992 and 3,710,019, for example.

An improvement of this procedure is disclosed with the raster rotation in multi-color printing processes in U.S. Ser. No. 124,864. A recording of the picture elements may be accomplished by the use of a cathode ray oscilloscope and then recorded on film material as described in U.S. Pat. No. 3,688,033 by means of an engraving member; for example, a stereo type heliograph available from the assignee of the present invention. Other means such as the use of suitable light sources such as described in U.S. Pat. Nos. 3,657,472 and 3,725,574 are particularly suited for the raster scanning and recording of color component images in multi-colored printing.

It is common in all methods using rastered scan recording processes to use puncti form spots as the so-called picture elements or raster points which are set equi-distant in a network-like arrangement. The distances between the picture elements are so small that they cannot be distinguished individually with the naked eye. In practice in conventional rastering, the size of these elements is 30 points per centimeter which is defined as "raster size 30". In cases where more refined rastering is required, up to approximately 60 points per centimeter "raster size 60", can be used. These raster points provide picture elements which can be regarded as $p$ points of concentration of the defined raster network, which in a particular example could comprise squares having a dimensions of 0.33 mm. Another example squares having dimensions of 0.167 mm can be utilized.

The scanning process for the purpose of obtaining the electronic data is accomplished in a known fashion with the aid of an opto-electrical scanner which measures the gray values of the individual picture elements of the picture and converts them to analogous electrical voltage values. In order to store the electrical data, these analogous values are quantized and coated and placed in a memory as binary numerical values.

In order to obtain a sufficiently fine gradiation of the gray values, the number of the quantum stages — i.e., the stages during the quantizing must be quite large. Thus, in order to store the gray value of a particular point element, a storage cell of bit size if required.

The stored picture consists of a fixed number of stored scanning data of the gray values of the individual picture elements. Since their number is dependent upon the raster used, the entire data complex is assigned to a specific picture scale. In order to reproduce pictures at other scales, pictures with the altered scales corresponding to the required raster size would have to be prepared by a photographic method prior to scanning. In order to be able to satisfy all scale requirements, required for later reproduction of pictures, it would be necessary to prepare many similar pictures in varying enlargements and with corresponding rastering, to then scan them and to record them and store such recorded data in a storage archive. Such a method would be time consuming and costly and would, in practice, require very large storage spaces.

SUMMARY OF THE INVENTION

The present invention relates to a method and apparatus for carrying out the method for the rastered reproduction of half-tone pictures on any desired scale which operates rapidly and utilizes very little storage space.

A further object of the invention is to alter the raster size in picture reproduction, as for example, if a different resolution is desired or required during printing. This may be accomplished when the scale is changed as well as when the picture to be recorded without a change in scale is reproduced.

In the invention the original picture is electro-optically scanned using the finest raster size necessary and the values ascertained are coded and stored. Additionally, in order to reproduce pictures at scales other than the original, the data of the four corner points of the mesh squares of the scanning raster in which the raster points of the reproduction network are located are removable from the memory and from such data, the recording data can be calculated by means of linear interpolation.

When maintaining the reproduction scale the linear interpolation is carried out with an enlargement or a reduction scale which corresponds to the desired compression or expansion of the recording raster as compared to the scanning raster, and the enlargement or reduction in the course of recording is reversible.

An advantageous further embodiment consists in wherein a changed reproduction scale is desired, the linear interpolation is carried out with an enlargement or a reduction which is selected to be greater or smaller by an amount which corresponds to the required compression or expansion of the recording raster as compared with the scanning raster, and that amount of enlargement or reduction during the recording process which can be correlated back to the raster compression or raster expansion is made reversible.

In order to obtain the picture in the desired scale with an altered raster, it is preferable to provide that the amount of enlargement or reduction during linear interpolation can be correlated back to the raster restriction or expansion and be reversible by the selection of distances between the recorded picture point elements in the direction of and transversely to the direction of recording.

An additional feature of the invention is that the calculations are accomplished according to the following formula:

$$N = \frac{\frac{Ab + Ba}{a+b} \cdot d + \frac{Cb + Da}{a+b} \cdot c}{c+d}, \text{ whereby}$$

N is the brightness value of the point which is to be reproduced, A, B, C, and D are the gray values of the corner points of the mesh square of the model network in which the point which is to be reproduced is located, and $a$, $b$, $c$, and $d$ are the intervals of this point from the vertical and horizontal lines of the network square in which the point is located.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which

DESCRIPTION OF THE PREFERRED EMBODIMENTS

The invention will be explained utilizing the following specific examples. The reproduction scale will be 1:1 and the raster is to be reduced to half space. For this purpose, the linear interpolation will be carried out as if the picture were enlarged by the factor of 2. However, during the recording operation, the distances between the raster points are reduced to half the space of the scanning raster so that the enlargement process will be reversible. It will be apparent that one-half of the raster points will be eliminated on the same space, in other words, the raster has been reduced to half the space.

As another example, the raster may be expanded while maintaining a constant reproduction scale. The linear interpolation is carried out as if the picture is being reproduced by the factor by which the raster is to be expanded. During the repeated recording, the reduction is again made reversible by corresponding expansion.

If, for example, the reproduction scale and the raster are to be changed, the linear interpolation will be composed of two interrelated factors, in other words, the factor resulting from the picture enlargement are a reduction for the purpose of altering the scale, and the second factor relating to the enlargement or reduction for the purpose of altering the raster. For example, let it be assumed that the desired scale alteration is an enlargement of 1:2 and the desired raster alteration is an expansion of 1:3.

Since an expansion requires a reduction, in other words, a factor of 3:1, the composite factor can be obtained as 1:2 × 3:1 = 3/2. The interpolation thus consists in a reduction by the factor of 3:2. If the reduction is made reversible for subsequent recordings which correspond to an enlargement of 1:3, the composite factor will be 1:3 × 3:2 = 1:2 as the composite scale. The picture will have been enlarged by the factor of 1:2, and the raster lines are spaced three times further apart than they were before.

If the raster is to be compressed, the corresponding factor is then to be considered as an enlargement which is again made reversible and there are many ways in which the enlargement or reduction can be made reversible as required by the change in the raster; for example, by a corresponding selection of the drum diameter, or by selection of the recording block pulse frequency together with the corresponding rate of advance of the axial scan.

It is also advantageous to utilize the apparatus and system described in U.S. Pat. No. 3,272,918 owned by the assignee of the present invention, in which digital picture signal processing occurs during the reduction or enlargement processes.

Figure 1:
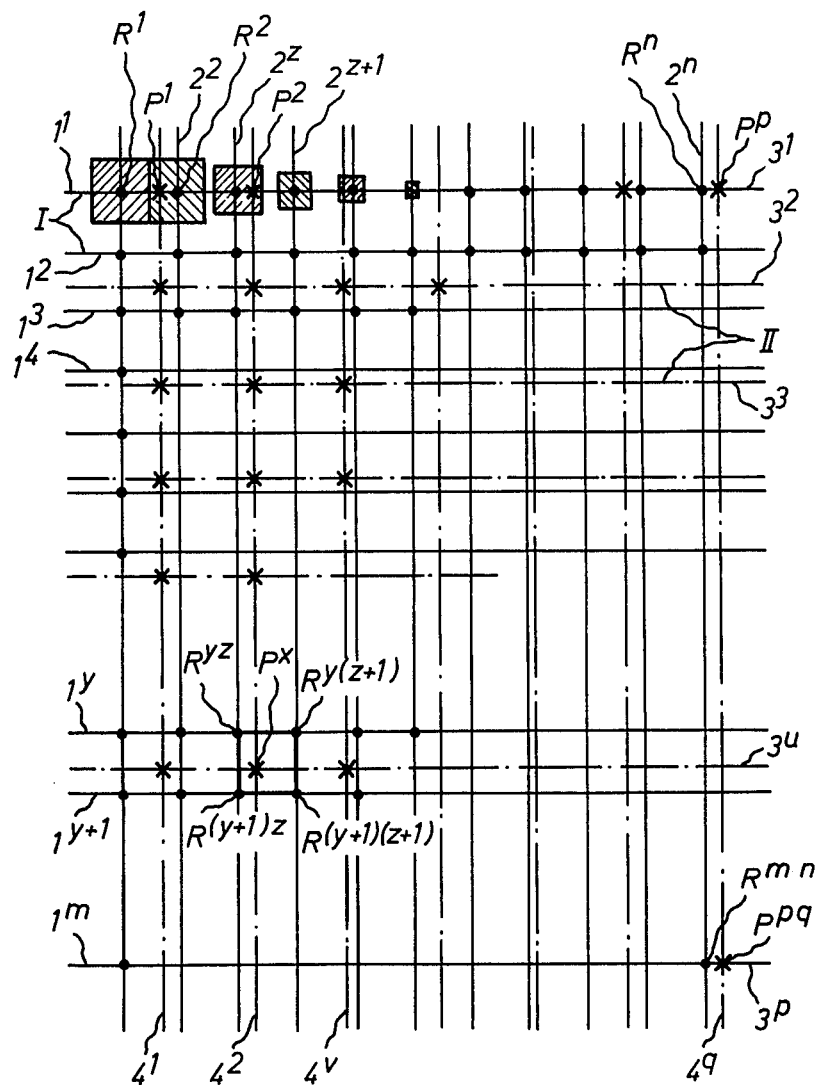
FIG. 1 illustrates raster network structures of a scanned model picture and of a recording picture in which the scale has been changed.

FIG. 1 illustrates a section from a raster network with raster points recorded or plotted in accordance with a storage scale of 1:1. Since the data of this raster network are in the memory and will serve as a basis for subsequent changes in scale, the raster network described will be designated as "a model picture". Likewise, the raster as the initial starting raster for other scales is to be designated as the "model raster".

After the original picture is scanned and stored, this model raster consists of the horizontal line $1^1$, $1^2$, $1^3$, to $1^m$, and the vertical lines $2^1$, $2^2$, $2^3$, and $2^m$. This forms an orthogonal network in which the intersection points are the key points of concentration of the raster points. The raster points $R^1$, $R^2$, ... $R^{m,n}$ are, as previously mentioned, spots of varying sizes which cover the raster fields more or less, corresponding to the desired blackness or gray scale of the picture.

For example, $R^1$ and $R^2$ cover the entire model raster field. These correspond to the blackest black sections of the picture. $R^3$, $R^4$ ... $R^7$ only partially fill the raster fields in varying percentages and illustrate varying intermediate gray scale values.

$R^8$ ... through $R^n$ have the smallest possible dimensions and correspond to pictures having white scale portions. It is to be realized, of course, that the shape of the raster points which are here illustrated as squares may also be different forms, as for example, diamonds or other conventional shapes.

For purposes of illustration, the case of a particular reduced reproduction will be assumed. The reduced picture in the following description referred to as a "reproduction picture" thus requires fewer raster points given the same raster scale; particularly fewer by the amount in which the picture surface of the reproduction picture is smaller than the surface of the model picture. The number of raster points per line and per row is known from the scale of the smaller picture which is to be reproduced. If line network I is covered with an equi-distant line net II for the reproduced picture which is formed from the lines $3^1$, $3^2$, $3^p$ and $4^1$, $4^2$, $4^q$, whereby the ratio of $n:p$ is equal to the reduction ratio, the intersecting points of the new lines represent the raster points $p^1$ ... $p^{pq}$ of the raster field of the picture which is to be reproduced. These points only appear to fall in a disorderly fashion between the raster points R of the model picture. As specified by the invention, the gray scale value data of adjacent points of the model picture are to serve this purpose.

These are the corner points of that raster network square in which raster point P of the reproduction picture which is to be individually determined is located. The intersecting point $p^x$ of two lines of network II fall into the square of network I which square is formed by the points $R^{yz}$, $R^{y(z+1)}$, $R^{(y+1)z}$ and $R^{(y+1)(z+1)}$. A gray scale value contained in the memory is assigned to each of these points. So as to make it easy to understand, one might imagine that the gray scale values are vertical line segments having links which are proportional to the gray scale values. The end points of these line segments form a "mountain range" whose mountain peaks correspond to the black and dark gray scale locations of the picture, and wherein the "valleys" correspond to the light gray and white scale picture areas. From this illustration, the environment of the point consisting of $P^x$ will be removed, and illustrated in a enlarged perspective view of FIG. 2.

Figure 2:
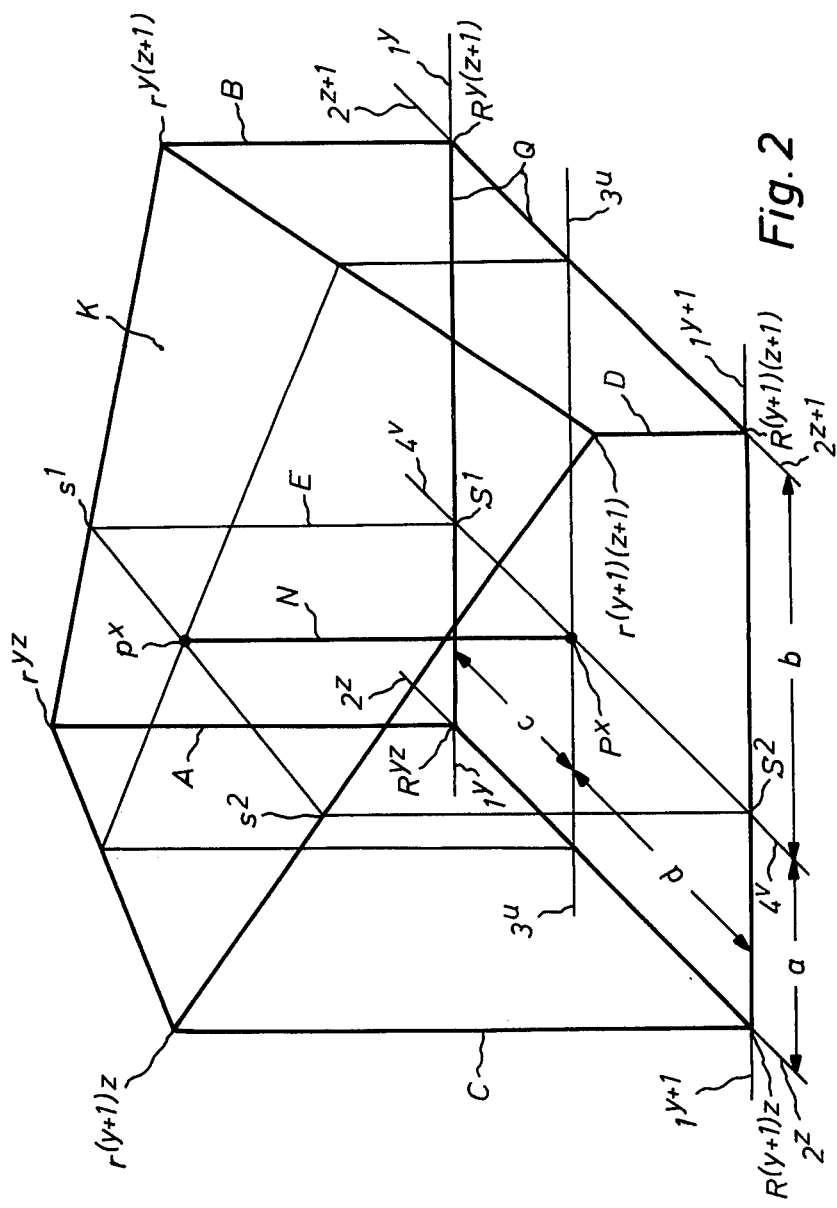
FIG. 2 illustrates in three dimensions the raster network square of the model picture with a raster point and gray value vectors of individual raster points of the picture to be reproduced.

In FIG. 2, the lines $1^y$, $1^{y+1}$, $2^z$ and $2^{z+1}$ represent the lines of the raster network I of the model picture. The intersecting points $R^{yz}$, $R^{y(z+1)}$, $R^{(y+1)z}$ and $R^{(y+1)(z+1)}$, are the key points of concentration of the raster points, and they form a square Q. The vertical line segments A, B, C and D over these points have links which illustrate the assigned and stored gray scale values. The end points $r^{yz}$, $r^{y(z+1)}$, $r^{(y+1)z}$, and $r^{(y+1)(z+1)}$, define the corner points of a surface K which is curved, since its corner points do not lie in a single plane. The lines connecting the corner points $r^{yz} - r^{y(z+1)} - r^{(y+1)(z+1)} - r^{(y+1)z} - r^{yz}$, may be regarded as an approximate straight line, since the surface K itself has only the dimensions of a raster field, and this dimensions is so small that the fact that it is not a planar surface will not be recognizable by the naked eye.

The lines $3^u$ and $4^v$ of the raster network II assigned to the picture which is to be reproduced, intersect at point $P^x$ passes through the curved surface K at point $p^x$. The point $p^x$ is the key point of concentration of the curved surface K and the line segment $n$ illustrates the gray scale value N which is assigned to $P^x$ during reproduction. The lengths $a$ and $b$ are the distances of the line $4^v$ of reproduction raster network II from the vertical lines $2^z$ or $2^{z\times 1}$, respectively, of the raster network I of the stored picture and $c$ and $d$ are the distances of horizontal line $3^u$ of the reproduction network II from horizontal lines $1^y$ and $1^{y+1}$ of network I. At point $S^1$, the intersecting point of line $1^y$ and $4^v$, a vertical line E is constructed which terminates in point $s^1$ in connecting line $r^{yz} - r^{y(z+1)}$. The length of the line segment E, and the gray scale value assigned to point $S^1$ is $$E = \frac{A \cdot b + B \cdot a}{a + b}$$

The gray scale value of point $S^2$ can be calculated in the same manner with said point $S^2$ being located at the intersection of raster network lines $4^v$ and $1^{y+1}$ and the calculated gray scale value will be $$F = \frac{C \cdot b + D \cdot a}{a + b}$$

in which F is determined by the line which passes through points $r^{(y+1)z}$ and point $r^{(y+1)(z+1)}$ and which also passes through point $s^2$. A line passing through the points $s^2 - s^1$ passes through point $p^x$ which lies in vertical line N.

$$N = \frac{E \cdot d + F \cdot c}{e + d}$$

$$N = \frac{\frac{A \cdot b + B \cdot a}{a + b} \cdot d + \frac{C \cdot b + D \cdot a}{a + b} \cdot c}{c + d}$$

N represents the density scale value of the raster point which is to be set in point $P^x$.

The sequence of setting the raster half-tone pictures which are to be produced is accomplished in three phases; 1, the original picture is scanned so as to obtain and store the gray scale value data, 2, such stored data is recalled from the memory, and 3, the calculation of the parameters required for calculating the recording data for the computer.

Figure 3:
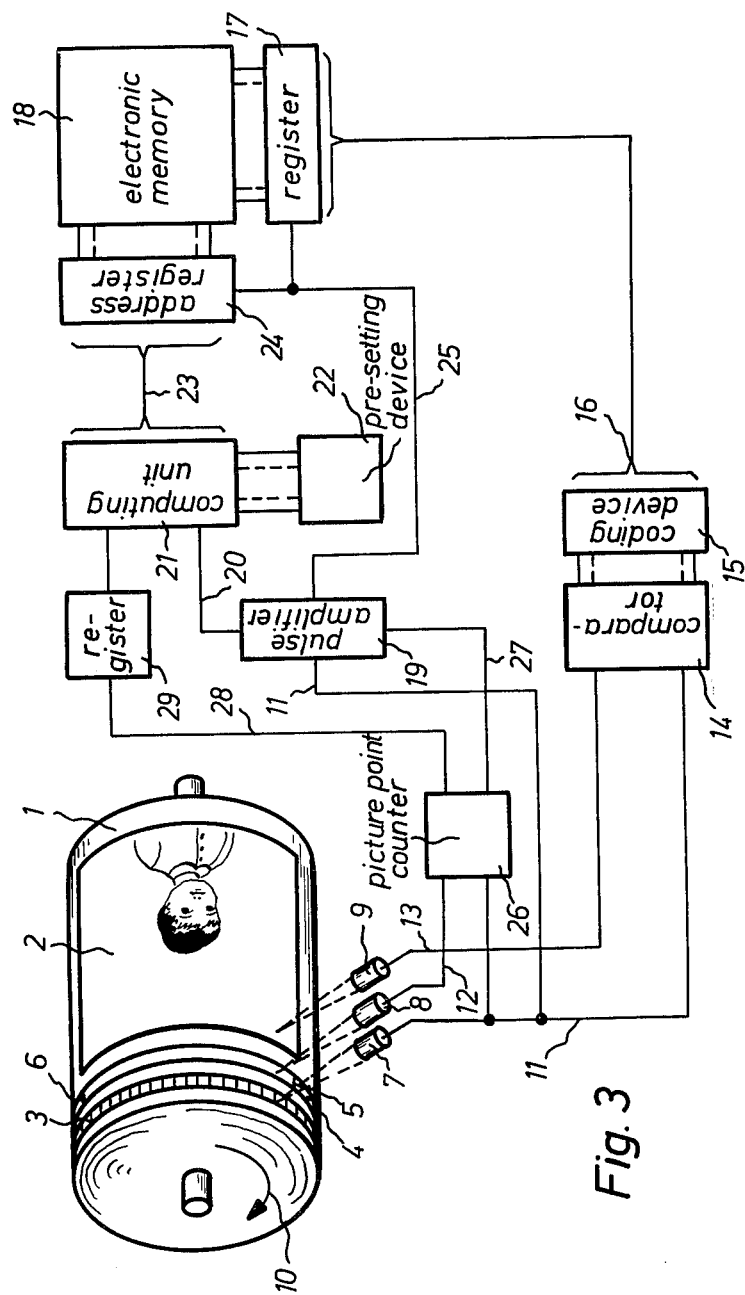
FIG. 3 is a block diagram of apparatus for scanning, acquiring data and storing the gray values of a model picture.

FIG. 3 illustrates apparatus for carrying out these operations.

An original picture has its upper edge located on the left edge of the drum parallel to the circumference of the drum. A reference scale is formed on the edge of the drum 1, which corresponds to the spacing of the raster to be used as, for example, it may have 30 marks per centimeter. Further markings 5 and 6 locate the upper and the lower edges of the pictures, respectively. The drum surface is illuminated by a light source, not illustrated, and adjacent the drum are mounted electro-optical scanning members 7, 8 and 9 which include optical systems and photo-electric cells which scan very small picture areas on the drum surface. The scanning member 7 is mounted so that it continuously scans the scale 3 on the drum 1, and the scanning member 8 is mounted so that it scans track 4, upon which the picture markings 5 and 6 are located. The scanning element 9 is movable in the axial direction of the drum, and is transported in the axial direction during each revolution of the drum so as to scan the surface of the picture 2. When the drum 1 rotates in the direction indicated by arrow 10, for example, voltages will occur at the output of the scanning members 7, 8 and 9, and will be applied to leads 11, 12 and 13, respectively. These voltages occur to the corresponding gray scale values of the scanned picture points. Timing pulses are supplied to lead 11, which vary between a minimum when the scanning device 7 scans a black point on scale 3, and a maximum when a white intermediate space is encountered. A pulse occurs on line 12 at the left picture edge marking 5 of track 4 as it passes the scanning device 8, and an additional pulse occurs when the upper picture edge marking 6 passes the scanning device 8. Output scanning voltages occur on lead 13, which correspond to the gray scale value of the scanned picture points, and such values can assume all values between minimum and maximum voltages. These output signals are fed to a comparator 14 by lead 13. The timing pulses are supplied to the comparator 14 by lead 11, and the comparator 14 supplies an output to the coding device 15, which then codes them into a plurality, as for example, 64 predetermined gray scale numbers between black and white. The corresponding code combinations are located on several electrical conductors at the output 16 of the coding device 15, by which the coded signals are conveyed as input information to an input register 17 of an electronic memory 18.

The timing pulses on line 11 cause a pulse amplifier 19 to be actuated which further supply the timing pulses to an address computing unit 21 through line 20. A pre-setting device 22 is connected to the computing unit 21 and allows it to be brought to any random initial position which corresponds to the initial address for the region in the memory 18 into which the storage information is to be read in. This address is put into an address register 24 of memory 18 through a line 23. Each pulse on line 20 raises the address in register 24 by "1" via computing unit 21 and line 23. An almost simultaneous pulse on line 25 delayed only by nano seconds relative to the pulse on line 20 causes the transfer of the information in register 17, in other words, the gray scale value of the picture point just scanned to that storage cell which is determined by an address register 24.

While scanning the picture, gaps occur between the end of one picture line and the beginning of the next picture line, for the picture is narrower than the circumference of the roller. In order to only utilize the picture points which correspond to the actual area of the picture, an additional counter, which is called the picture point counter 26, is provided, which counts the number of picture points per focal line. This counter is started with each revolution of the drum 1 when the marking 5 which is assigned to the lower picture edge, is detected by the scanning head 8. The counter 26 is stopped by the upper picture edge marking 6 detected by the scanning head 8. During the operating period of counter 26, pulses reach the timing pulse amplifier 19 through line 27 in a period between the scannings which corresponds to the time between the beginning and the end of the focal lines, and by means of coincidence with the timing pulses on the input line 11, make it possible for these pulses to pass through amplifier 19. Address computing unit 21 remains blocked during the period between the end of a focal line scanning and the beginning of the next focal line.

So as to ensure problem-free re-recording, it is expedient to store the information groups of the individual focal lines in sub-regions of the memory, which sub-regions may be individually addressed. Therefore, a register 29 is actuated from picture point counter 26 at the end of each picture line through a line 28 and register 29 corrects the address computing unit 21 in accordance with a previously supplied program, so that the address register 24 can transfer the data of each new picture line to a storage region with a predetermined initial address.

So as to scan the next picture line after each revolution of the cylinder 1, the scanning head 9 is conveyed in an axial direction by the amount of a picture line interval by means of a non-illustrated gear drive unit which is coupled to the cylinder driving mechanism, and such axial movement process is continued until the entire surface of the picture is scanned and stored in the memory 18. Afterwards, the picture information may then be recovered and removed from the memory for purposes of re-recording.

In a particular example, the memory 18 comprises a core memory, and it is to be realized that other memories can be used, as for example, in practice bulk storages, for example, drum storages or disc storages are often used, since the storage of half-tone pictures requires a relatively large amount of storage capacity.

Figure 4:
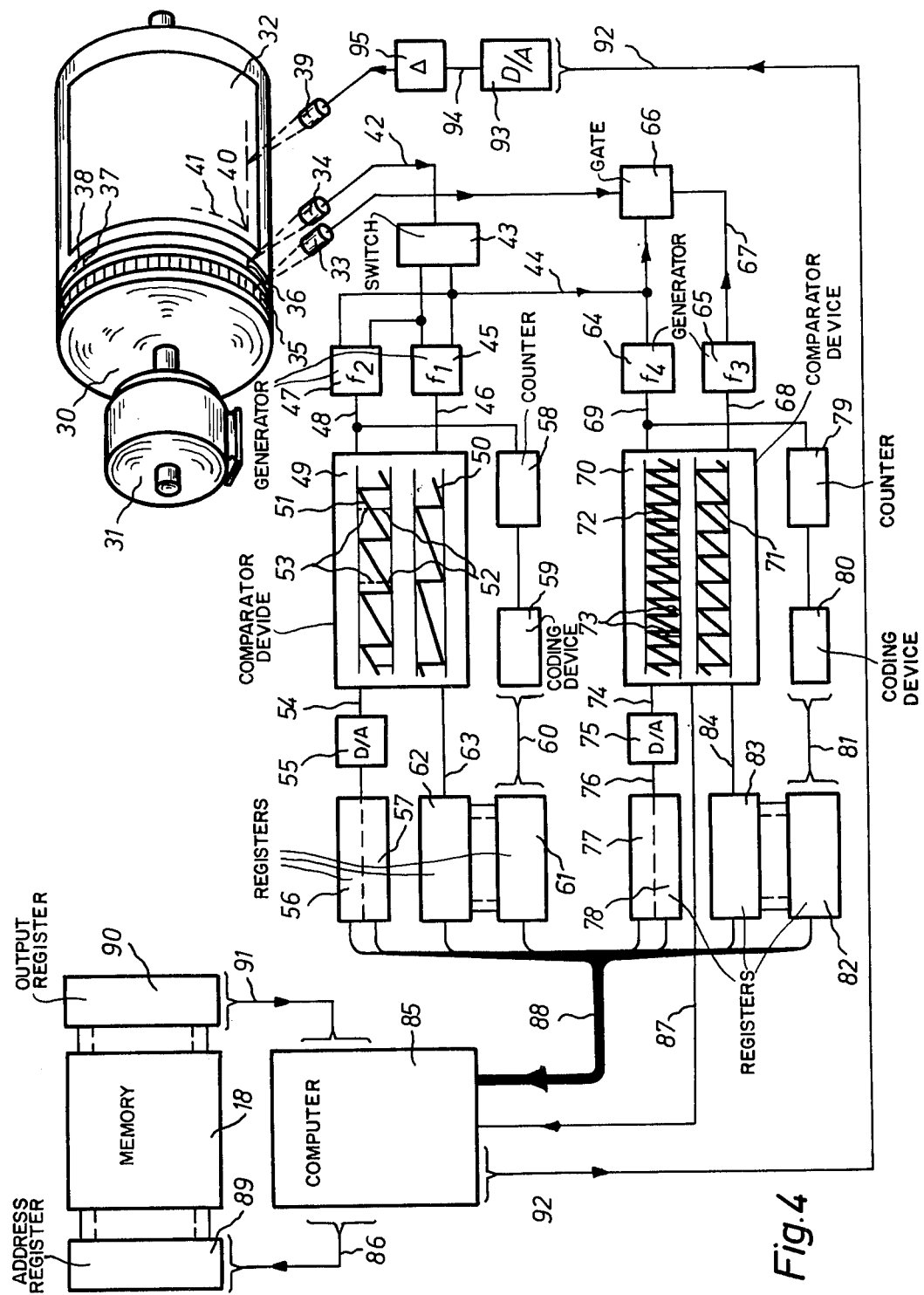
FIG. 4 is a block diagram of a system for calculating, incoding and recording data for the raster points.

The re-recording of the picture with a changed scale is illustrated in FIG. 4. This particular example is illustrated wherein the reproduction picture is to be reproduced in a reduced fashion as compared with the original picture, in other words, as compared with the model picture.

For a more complete understanding of the system of FIG. 4, the following observations may be considered.

Let it be assumed that the raster network I of model picture and the raster network II of the reproduction picture are superimposed as illustrated in FIG. 1. This means that raster network II of the reduced picture is expanded to the size of the model picture field. Let it be assumed that the expansion factor of 1.8, for example, the reciprocal value of the reduction factor of the picture which is indicated as approximately 1:1.8 in the example of FIG. 1, and the correlation of the picture points of the model picture and the reproduction picture are thereby determined.

The time sequence of the reproduction process is intended to proceed such that the read-out operation of the picture information from the memory and the recording of the individual picture line takes place synchronously.

However, since the picture which is to be reproduced has different raster spacings than the model picture, the timing pulse frequencies of the recording and the read-out operation of the information from the memory will differ.

These relationships are described in U.S. Pat. No. 3,272,918, for example. In FIG. 1 of this Patent, it is illustrated how timing clock pulses are applied for the read-in operation and the read-out operation from the memory during enlargement or reduction. Related memory control is also disclosed in this patent.

As is known from the description of FIG. 3, the data of the individual picture points of the model picture are stored according to their picture lines in groups of storage cells of the memory 18. In the present invention, the process of re-recording the picture should also proceed in line-fashion. However, the recording data is not identical with the stored data for far fewer raster points are required during the reduced re-recording of the picture than have been stored as picture points of the model picture. During recording of a picture line, with 1,000 raster points, for example, using a scale of 1.8:1, the data of 1,800 picture points are available when the memory, and are used in order to ascertain the recording data for the 1,000 points. However, the same factor of 1.8:1 is valid for the number of lines.

Let it be assumed that the first picture line $1^1$ of FIG. 1 of the model picture coincides with the first picture line of picture $3^1$ of the picture which is to be reproduced. This assumption may be made because the dimensions of the picture points and the raster points are infinitesimal to the human eye. If the model raster spacing is applied as a unit, second line $3^2$ then has the distance of 1.8:1 from the initial line $1^1$, which at the same time is the edge line of the picture. It is located in the strip between lines $1^2$ and line $1^3$ of the model pictures. The third line $3^3$ of the reproduction picture has the spacing of 3.6, but it falls beyond the model picture line $1^4$ in the region between $1^4$ and $1^5$. The distances between lines $3^3$ and lines $1^4$ and $1^5$ can be determined by using simple differential calculations. This applies to each picture line 3 of raster network II. In this manner, the parameters $c$ and $d$ shown in FIG. 2 can be obtained as distances of a random line $3^u$ and lines $1^y$ and $1^{y+1}$. In practice, this may be accomplished by two numeral sequence counters of which one indicates the picture lines of the model picture, and the second indicates the picture lines of the reproduction. Thus, the initial values for calculating the parameters $c$ and $d$ are obtained. However, the counters simultaneously indicate the storage regions in which the information of the raster points of picture lines $1^y$ and $1^{y+1}$ are stored. The addresses of these two storage regions are maintained in registers and applied to the entire recording of picture line $3^u$.

Quite similar consideration is applied to the recording of the picture lines. Again, two counters can determine the correlation of the raster network lines. One counter will register the number of raster points per line of the model pictures, and the second counter will register the number of raster points of the reproduction picture. In this manner, these counters indicate the initial values for calculating the parameters $a$ and $b$ as distances of the lines $4^v$ of raster network II from lines $2^z$ and $2^{z+1}$. Thus, the addresses of the regions of picture lines $1^y$ and $1^{y+1}$ are determined by the picture line counters and the storage cells in storage regions are determined by the raster point counters. The storage regions contain the gray scale data A, B, C and D of raster point $R^{yz}$, $R^{y(z+1)}$, $R^{(y+1)z}$, $R^{(y+1)(z+1)}$. These data are recalled from the electronic memory and are used in the calculating formula of the invention in order to calculate the gray scale value point which is to be recorded.

FIG. 4 illustrates a drum scanning device similar to that illustrated in FIG. 3 for use in re-recording. A recording drum 30 is driven by a motor 31 at the sheet 32 upon which the recording is to be made is attached to the surface of the drum 30. Indexing electrooptical scanning heads 33 and 34 are mounted so as to respectively scan a scale 35 mounted on the drum 30, and a scale 38 on the drum 30. The scanning head 33 might scan the scale 35 which has distance markings of 30 per centimeter, for example, corresponding to the raster dimensions. The scanning head 33 provides the control timing pulses whose frequency is dependent upon the rotational speed of the drum surface. The scanning head 34 scans marking 36 and 37 on strip 38. It is to be realized, of course, that the markings are movable so as to mark the beginning and end of the recorded picture lines and, thus, the left and right edges of the reproduction picture.

A recording member 39 is arranged in an axially movable manner relative to the drum 30, and during the recording process, starting from initial period 40 on on edge of the sheet 32, moves further to the right in the axial direction by one raster step during each rotation of the drum 30. Picture line 41 which is assigned to position 40, corresponds to the upper edge of the reproduction. The recording member 39 may be an engraving needle when engraving printed forms, or it may be a focused light beam utilizing optical recording apparatus.

Timing pulse frequency $fa$ for the recording process is determined by means of the measurements of the rotating speed of the drum as well as its dimensions so as to calculate the circumferential speed. The read-out frequency $f_2$ is equal to $1.8 \cdot fa$ from the memory is there also determined, and the frequency corresponds with reduction scale of 1.8:1 of our specific example. The recording lines do not succeed one another without gaps, and this must be considered in the apparatus. The effective recording time $ta$ is the time between the scanning marks of the marks 36 and 37.

A pause period $t_p$ then falls until mark 36 is again reached in order to record the next line. This pause period is useless in terms of the recording and read-out operation, and therefore, it must be faded out. For the sake of further consideration, let it be assumed for the time being, that no gap exists, and that the scanning of the individual lines follows one another without gaps. An example of a solution for fading out pauses between the lines shall be provided later.

Figure 9:
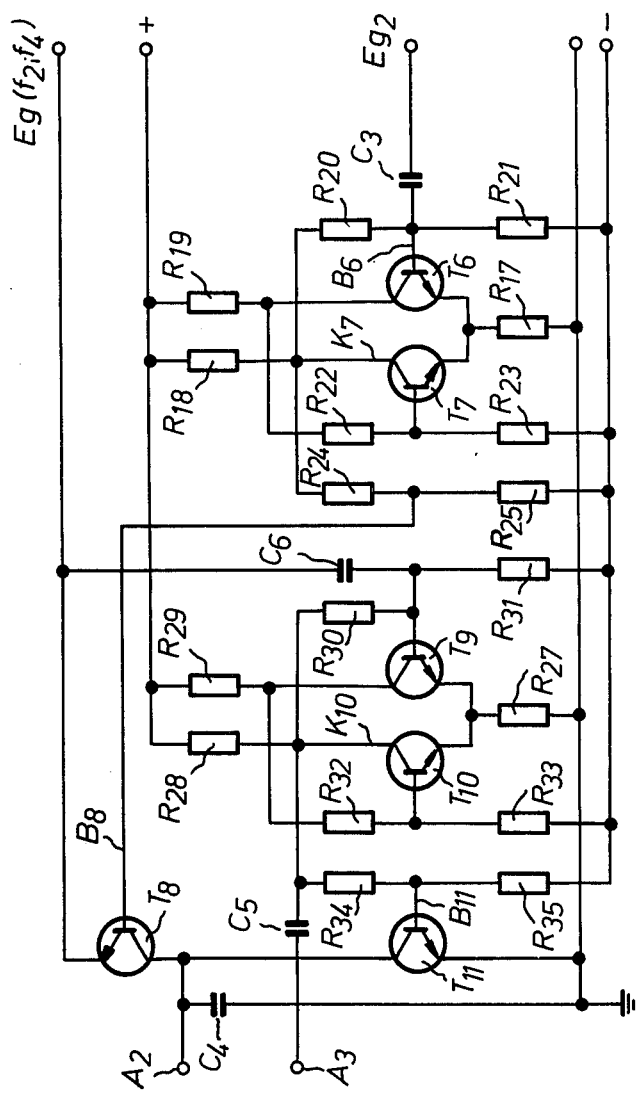
FIG. 9 is a circuit diagram of a comparison device for sample and holding and for determining the calculating parameters $c$ and $d$, or $a$ and $b$, respectively.

An electronic switch A3 is actuated via line 42 by the line beginning pulses provided by the scanner 34. The electronic switch 43 starts the generator 45 which produces an output at a frequency of $f1$ and is connected to the switch by line 44. The generator 45 produces an output voltage which starts at zero, and has a steadily increasing voltage which is supplied by the line 46 to the comparator device 49. The voltage output of the generator 45 increases until it reaches its maximum at a time when the mark 37 is adjacent the scanning head 34. At the same time, the generator flips back to its initial position. This is accomplished by means of measuring and regulating R C elements in the oscillating time period circuits, as well as the circumferential speed of the drum 30. Subsequently, the second saw-tooth period again begins with zero voltage. An additional saw-tooth generator 47 which has an output frequency of $f_2$ is connected to line 44. It is turned on by the first pulse produced by mark 36, in other words, at the beginning of the reproduction of the first picture line of picture I and then oscillates freely during the entire duty cycle. Its frequency is adjusted to a value which is 1.8 times higher than that of generator 45; this means that frequency $f_2$ is equal to 1.8 times $f_1$. The output voltages of both generators are conveyed through lines 46 and 48 to the comparator device 49 in which the saw-tooth voltages of both generators are compared. Each time the saw-tooth voltage of generator 45 which is illustrated by curve 50 the voltage of saw-tooth voltage $f_2$ from the generator 47 is fixed, and measured. The output voltage $f_2$ is shown by curve 51. Line segments 52 represent such ascertained instantaneous voltage values. The comparator device 49 operates according to the so-called "sample and hold" method which continuously examines the values of a variable voltage and retains the instantaneous values existing at specified time periods. In other words, it stores them for a short period of time. A circuit arrangement of this type is shown in FIG. 9, and will be described later.

If the chronological voltage gradient of both generators 45 and 47 are placed in a relationship illustrated in FIG. 1, it will be apparent that the time axis of both voltages proceeds vertically downward, whereby the lines $3^1, 3^2 \ldots 3^p$ correspond to the individual successive flip points of the saw-tooth voltage 50 of generator 45, and lines $1^1, 1^2 \ldots 1^m$ correspond to the flip time period of voltage 51 of generator 47. The chronoligical sequence is to be regarded as continuous beginning with line $3^1$. In the periods between lines $3^2$ and $3^3 \ldots$ the saw-tooth voltage rises steadily and upon reaching the upper limit, at the time the next line is reached, it flips back to zero. The same thing occurs with saw-tooth voltage 51 when at the output of generator 47. Between the time periods $1^1, 1^2 \ldots$ the voltage 51 steadily rises from zero to its maximum, and thus, from $1^y$ to $1^{y+1}$, for example. Within this time interval, for example, during the time period $3^u$, the saw-tooth voltage 50 flips over and as is shown in FIG. 4, establishes an instantaneous voltage value for the length of line segment 52. The line segment 53 establishes the dimension of the line $3^u$ from $1^y$ and as is even more clearly shown in FIG. 2, represents the parameter $c$ desired for the calculation. The parameter $d$ is equal to the distance of line $3^u$ from $1^{y+1}$, and is illustrated by the supplementary line segment 53 which corresponds to line segment 52 up to the maximum amplitude of the saw-tooth voltage 51.

An analogous digital transducer 55 is connected by a line 54 to the comparator device 49, and quantizes the ascertained values $c$ and $d$ into 64 or 128 states, for example, and transfers them in binary code form to registers 56 and 57, where they are available for the subsequent computer calculations.

Analogous digital transducers or component units which are offered in various embodiments by a number of manufacturers and vary in operation velocity and the number of code stages depending upon the respective requirements. As a specific example, "Teledyne Philbrick Product Guide", component elements 4008, 4014, 4020, can be used for the digital transducers.

The output line 48 of generator 47 is also connected to counter 58. As is known, the changeover time of the saw-tooth voltage represents the end of a read-out period of the data of a picture line of the model picture from the memory, and counter 58 reacts through the pulses which are obtained from the voltage changes at the changeover time periods. Thus, it counts the number of picture lines of the model picture which are recalled from the memory. Each counted number is coded in the coding device 59 connected to the output side and transferred to a register 61 via a multi-line 62. A parallel register 60 also receives the same information.

If, in an additional work cycle, the saw-tooth voltage 50 of generator 45 also flips over and changes state, a pulse is also obtained by means of differentiation, which reaches the parallel register 62 through line 63 and changes its information content by "1" while register 61 maintains its present value.

Thus, the numbers of two picture lines: lines $1^y$ and $1^{y+1}$ of the model picture, between which picture line $3^u$ is located, which contains the raster points which are to be recorded, are now available in register 61 and register 62. Also, the distances $c$ and $d$ of line $3^u$ from picture lines $1^y$ and $1^{y+1}$ are known and are contents of registers 56 and 57. The initial addresses of the storage regions in which the data of the picture lines for the ascertained numbers are located, are determined by the computer.

A supplementary statement as to how the empty periods between the recordings of the individual picture lines, in other words, between the recording of end mark 37 of one line, and the beginning mark 36 of the next line are eliminated. Both generators 45 and 47 are saw-tooth generators, and they operate with timing circuits which consist of capacitors and resistances. The increasing voltages obtained by charging a capacitor through a resistor, whereby measures must be taken to ensure that the charge current will remain constant. By interrupting the charge current circuit, the charge operation may be interrupted at any time, and for an arbitrary period of time. When it is switched on again, the charge operation continues in precisely at the same rate from the same location and completes the period of the saw-tooth voltage. Pulses supplied by lines 42 actuate the electronic alternating switch 43 which changes its position with each pulse. A pulse produced by mark 36 actuates the switch in such a manner that both generators 45 and 47 operate via lines 44 and 46. The pulse produced at the end of the recording of a picture line by mark 37 switches switch 43 back to its initial position and stops the timing circuits of the generators in the operating state in which they are engaged at that moment. In the course of further rotation of the drum or cylinder 30 mark 36 reaches the scanning location and a pulse is produced which again switches on switch 43 so that generators 45 and 47 are released. As described above, the generator 45 begins from the zero position into which it has been triggered by the pulse from the mark 36 because the recording of a new picture line has begun. Generator 47, on the other hand, starts from a position on the saw-tooth curve at which it has remained during the stop time. A circuit construction which meets these requirements and solves this problem is described relative to FIG. 7 and FIG. 8.

The cycle of a picture line recording is relatively long for example, let it be assumed that it lies in the order of magnitude of 1 second. Assuming a picture line link of 10 cm, for example, approximately 1,000 raster points are to be recorded within this time period. The time required in order to record a point thus lasts approximately 1 millisecond. Two additional saw-tooth generators 64 and 65 are provided for recording the raster points. Generator 64 is operated by means of pulses which are provided by scanner 33. These are, as explained above, 30 pulses per centimeter on the drum circumference, corresponding to the raster 35. The generator 65 is started for a new period by each pulse. The timing circuits are measured such that the saw-tooth voltage increases precisely from "0" to the maximum within the time of 1 period.

The generator 65 is tunable to a frequency which is 1.8 times higher than the output frequency of generator 64, by means of the tuning elements, such as the capacitor and charging resistor in generator 65. The work cycle of a picture line recording is started by an impulse beginning mark 36 and ends by means of a pulse end mark 37. During this entire period, generator 65 oscillates freely. Voltages reach line 44 with the beginning pulse by means of switch 43 and opens a gate 66 so that the pulses which scanner 33 derive from the raster 35 can reach the generator 64 through gate 66 and line 67, and thus start generator 64. This occurs each time a new picture line recording occurs.

With the voltage on line 44 also actuates generator 64 which operates as long as the voltage exists, in other words, during the entire recording period of a picture until line 44 has no voltage due to the switch back of switch 43 at the end of a picture line recording.

The output voltages of generators 64 and 65 are conveyed to the comparator device 70 through lines 68 and 69. The comparator device 70 operates similar to the comparator device 49 with a correspondingly different dimensioning of the component elements. Each time saw-tooth voltage 71 of generator 65 drops to zero, pulses are obtained with which the aid of the instantaneous values of the saw-tooth voltage 72 of generator 64 are ascertained and held. Line segments 73 represent these instantaneous values. Referring to FIG. 2, they represent the distance of the raster network lines $4^v$ of raster network II from the line $2^z$ of the raster network I. This is the parameter $a$ of the calculating formula of the invention. The parameter $b$ is the supplementary portion up to the maximum of the saw-tooth voltage.

As in the instance described above, the values of the line segments 73 are conveyed to the line counting device through a line 74 and then to the A/D converter 75 and changed into binary numbers. These binary numbers are supplied to registers 77 and 78 through the multi-line 76 which registers and keep the values of the parameters $a$ and $b$ available for computer calculation.

A counter 79 is connected to line 69 which counts the continuous numbering of the raster points of the picture line of the model picture which has just been processed. Each number is coded in binary fashion in the coding device 80 connected to the output side and transferred to a register 82 via a multi-line 81. Such number is stored in register 82 for later use.

A parallel register 83 initially accepts the same information. If an additional number pulse reaches register 82 from line 69, through counter 79, the coding device 80 and line 81, before an instantaneous value 73 is ascertained by a flip-over voltage on curve 71, this new number, increased by "1" instead of the previous number is placed in registers 82 and 83. However, if a voltage flip-over takes place during the increase phase of a period of voltage 72, the contents of register 83 and only the contents of register 83 is increased by "1" by way of line 84. The data in registers 82 and 83 indicate the numbers of the vertical line $2^z$ and $a^{z+1}$ of raster network I, between which the vertical lines $4_v$ runs on which the raster point $p^x$ which is to be set, is located.

Now all data have been obtained from which a computer 85 can ascertain the control data for the recording process. The computer 85 may be a computer which is specifically wired for the purpose of the present invention; however, it may also be a normal computer installation. It must operate at a speed which can be met by all conventional universal computer installations. From the picture line numbers $1^y$ and $1^{y+1}$ of the raster network I, which are stored in registers 61 and 62 and from the numbers of the raster points $2^z$ and $2^{z+1}$ of these picture lines, which are contained in registers 82 and 83, the computer 85 calculates the addresses of the storage cells wherein the gray scale values A, B, C and D of points $R^{yz}$, $R^{y(z+1)}$, $R^{(y+1)z}$ and $R^{(y+1)(z+1)}$ are stored, and recalls them. Together with the parameters $a$, $b$, $c$ and $d$ which are already in registers 56, 57, 77 and 78, the computer calculates the gray scale value N according to the formula given by the invention.

The flip-flop pulses illustrated by curve 71 in FIG. 4, which are the time periods of the removal of voltage values 73, simultaneously mark the end of the recording period of one raster point and the beginning of the recording of the next, respectively. The pulses are conveyed to a computer 85 via line 87. A computer process is started by each process, and the computer process leads to the determination and recording of the data of a raster point. This process proceeds very rapidly and is completed long before a new pulse introduces an additional computer process.

All numbers of the picture lines and the picture points contained in registers 61, 62, 82 and 83, as well as the parameters $a$, $b$, $c$ and $d$ are transferred to the computer by a pulse on line 87 via a multiple line 88. The addresses of the storage regions of the corresponding picture lines are ascertained from the numbers of registers 61 and 62 on which the picture points which are to be recorded are located. The numbers of registers 82 and 83 indicate the ordinal numbers of the storage cells of both picture lines which have been called in by the program. Four storage cells are to activated, whose address numbers are supplied to address register 89 through lines 86. Each has a storage capacity of a word, the content of a byte; in other words, the logical value of 256. Thus, one of 256 gray scale values could be stored in each cell.

The data recalled from the memory 18 (FIG. 3) are placed in output register 90, and from there proceed to computer 85 via lines 91. They represent the gray scale values of A, B, C and D of the four raster points $R^{yz}$, $R^{y(z+1)}$, $R^{(y+1)z}$ and $R^{(y+1)(z+1)}$, which correspond to the corner points of the square of network raster I illustrated in FIG. 2, in which square $p^x$ which is to be recorded is located.

The proper computer program can be set up by a computer expert and the sequence of the computation according to the formula given elsewhere in the invention proceeds without any problems. The so-called program language, such as ALGOL, FORTRAN, and others, can be employed. In the present invention, FORTRAN has been expedient and works very well.

Figure 5:
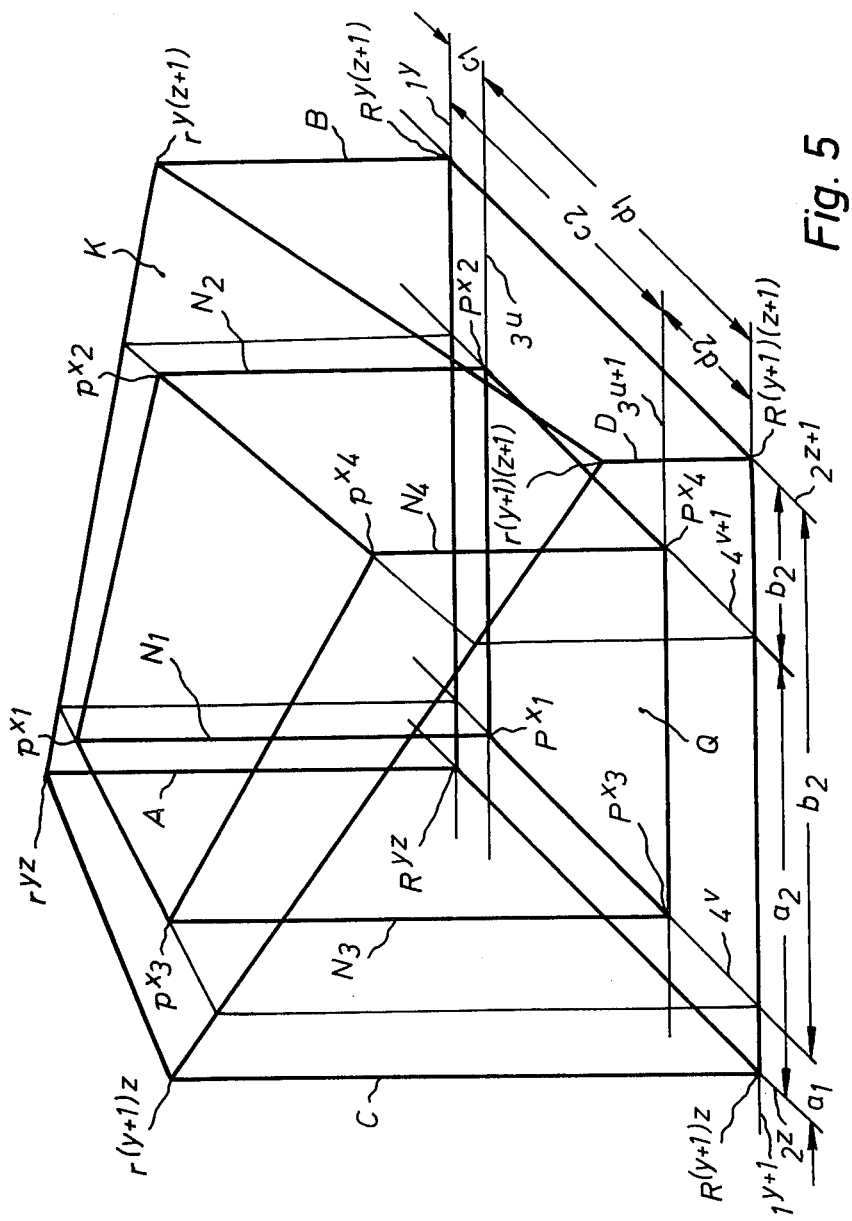
FIG. 5 illustrates a three-dimensional model picture of a raster network square with four raster points which are to be recorded for picture enlargement.

The results of the computer calculations are supplied to a digital analogous transducer 93 in the form of a binary number through a multi-line 92. Such digital analog transducer 93 feeds recording member 39 through line 94 and power amplifier 95. FIG. 5 illustrates a three-dimensional representation for an enlargement. In the example corresponding to FIGS. 1 and 2, the point of departure was that the reproduction is smaller than the model picture. It is frequently necessary to make enlarged reproductions. This is quite possible within the framework of the invention, with the aid of the stored data. In this case, there are fewer, possibly even far fewer, stored gray scale value datas available than are required for reproduction; in other words, the number of recording raster points must be considerably increased as compared with the stored raster point values. The data of the missing points are obtained by means of interpolation as shall be described below.

In the case of picture enlargement reproduction networks II has narrower mesh squares than the model raster network I. More than only one recording raster point will then lie in a square Q of the model network I. FIG. 5 illustrates an instance in which four raster points $P^{x1}$, $P^{x2}$, $P^{x3}$ and $P^{x4}$ of the picture which is to be reproduced fall into square Q of the model network. The brightness values of these points are represented by vertical line segments $N_1$, $N_2$, $N_3$ and $N_4$, all of which line segments terminate on the curved surface K. Curved surface K as previously mentioned, is a fragmentary surface of the gray scale three-dimensional representation of the model picture. End points $p^{x1}$, $p^{x2}$, $p^{x3}$ and $p^{x4}$ of vertical line segments $N_1$, $N_2$, $N_3$ and $N_4$ are located within surface area K. In order to calculate each of these values, the same data of the corner points $R^{yz}$, $R^{y(y+1)}$, $R^{(y+1)z}$ and $R^{(y+1)(z+1)}$ may be used four times, which correspond to the stored values A, B, C and D of the formula of the invention. The value of $a$, $b$, $c$, and $d$, however, differ. They differ because the distances of lines $3^u$ and $3^{u+1}$ of network II from lines $1^y$ and $1^{y+1}$ of model network I or because of the distances of lines $4^v$ and $4^{v+1}$ from lines $2^z$ and $2^{z+1}$ respectively. For point $p^{x1}$, the values $a_1$, $b_1$, $c_1$ and $d_1$ are obtained. For $P^{x2}$ the values $a_2$, $b_2$, $c_1$ and $d_1$ are obtained. For $P^{x3}$, the values $a_1$, $b_1$, $c_2$ and $d_2$ are obtained.

Figure 6:
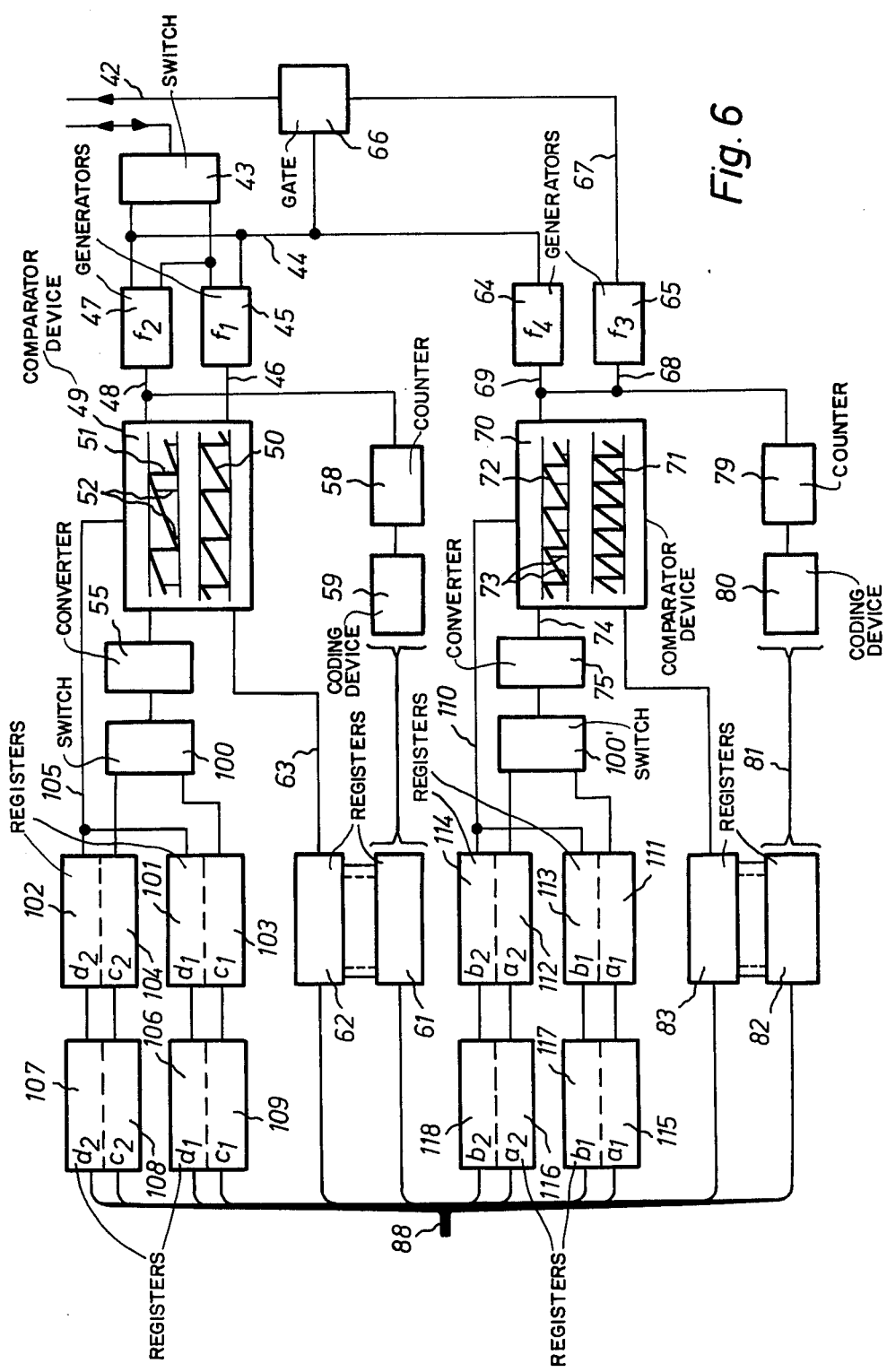
FIG. 6 is a block diagram similar to FIG. 4 with modifications for accomplishing the results illustrated in FIG. 5 for recording four raster points within a model network square for picture enlargement.

The example for carrying out the method for the enlarging process is illustrated in FIG. 6 and substantially agrees with the case for reducing the picture, as illustrated in FIG. 4. Therefore, the same reference numerals are used in FIG. 6 for the same components as illustrated in FIG. 4. The function of the circuit shall be described only insofar as it differs from the function of that of FIG. 4. Only the frequency rate shows $f_1$ and $f_2$ of the saw-tooth generators 45 and 47 have changed, since generator 45 now supplies the higher frequency than generator 47, and generator 65 a higher frequency than generator 64. In FIG. 6, for example, saw-tooth waves of the interrogation frequency 50 and recording frequency 71 are illustrated in comparator devices 49 and 70. Thus, the recording frequency 50 in device 49 is now higher than the frequency of saw-tooth voltage 51 which controls the recall data from the memory. It is, therefore, possible in sample 2 that a plurality of sample line segments 52 occur in one period of saw-tooth voltage 51. As described, these two voltage values 52 are encoded in device 55 and stored in registers 101 and 102 through the throw-over switch 100. Thus, the smaller value first ascertained in register 101 and then the larger value is determined and later stored in register 102. The complementary values 101 or 102, respectively, are entered into registers 103 and 104, up to a maximum amplitude. Pulses obtained by a flip-flop pulse of saw-tooth voltage 51 (which flip-flop pulses follow the determination of the last sample voltage) through a line 105, causes the information in registers 101, 102, 103 and 104 to be shifted to storage registers 106, 107, 108 and 109, where such information is made available for the subsequent calculation of the gray scale values of the raster points. However, directly following registers 101, 102, 103 and 104, must be prepared for receiving additional sample voltage values, while the registers 106, 107, 108 and 109 have not yet conveyed their data to the computer for the purposes of computing the parameters $d_1$, $c_1$, $d_2$ and $c_2$, and thus, the registers 106, 107, 108 and 109 are, therefore, not free.

The registers 61 and 62 are loaded with the numbers of both picture lines $1^y$ and $1^{y+1}$ in exactly the same way as described with reference to FIG. 4. From these registers, the addresses of the storage cells are obtained in which the recording data of the raster points this time a plurality of raster points are stored.

For a better understanding of FIG. 6, reference is again made in FIG. 5. FIG. 5 illustrates that on each of the two network lines $3^u$ and $3^{u+1}$, which pass through networks where Q of raster network I, to raster points $p^x$ are provided which are $P^{x1}$ and $P^{x2}$ on line $3^u$ and $P^{x3}$ and $P^{x4}$ on $3^{u+1}$, which extend through the network lines $4^v$ and $4^{v+1}$ of raster network II. In this way, parameters $a_1$, $b_1$, $c_1$ and $d_1$ result for $P^{x1}$. Parameters $a_2$, $b_2$, $c_1$ and $d_1$ exist for $P^{x2}$, and $a_1$, $b_1$, $c_2$ and $d_2$ for $P^{x3}$; and finally for point $P^{x4}$, $a_2$, $b_2$, $c_2$ and $d_2$.

Two flip-over time periods of curve 71 of generator 65 fall in one period of saw-tooth voltage 72 of generator 64, and two sample values 73 must therefore, be ascertained. Similar to the described operational sequence of the pictures lines, these sample values of the raster points are conveyed to registers 111 and 112 through line 110, and represent parameters $a_1$ and $a_2$. Registers 113 and 114 receive the information of the complementary values $b_1$ and $b_2$ up to the maximum value of the saw-tooth voltage through throw-over switch 100.

In the flip-change-over time period of curve 72, the data from registers 111, 112, 113 and 114 are shifted to registers 115, 116, 117 and 118, and registers 111, 112, 113 and 114 are immediately again prepared to accept new data, while the data of parameters $a_1$, $b_1$, $a_2$ and $b_2$ in registers 115, 116, 117 and 118 are ready for computer calculations.

Figure 7:
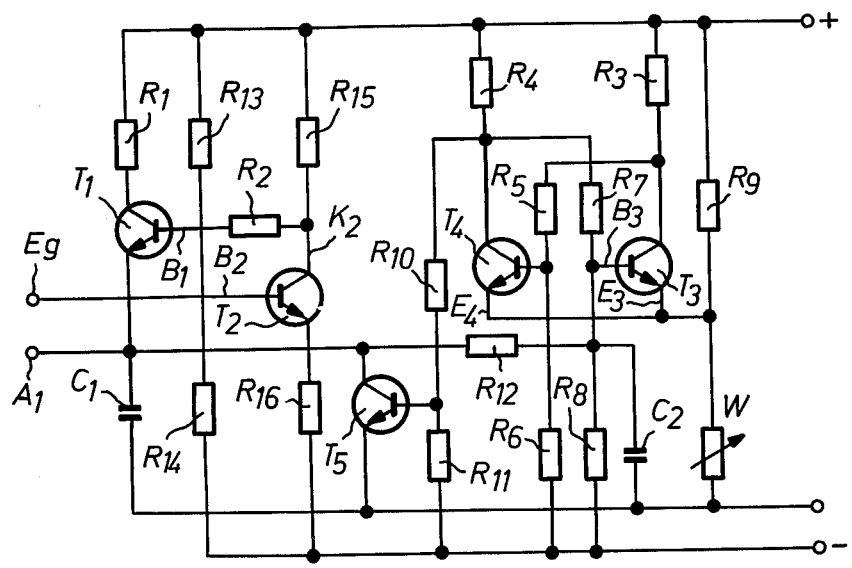
FIG. 7 is a circuit diagram of a saw-tooth generator for fading out of dead periods.

With the embodiments illustrated in FIGS. 6 and 7, an enlargement of a maximum of 1:2 is possible, because only then do a maximum of four points $P^x$ fall in a square Q of the model raster network. Since the intention is to extend the enlargement factor, this is possible by enlarging the number of registers 101 through 104 with shift registers 106 through 109, as well as the number of registers 111 through 114, with shift registers 106 through 109, as well as the number of registers 111 through 114, with shift registers 115 through 118. The number of auxiliary registers must be at least as great as the required enlargement factor.

FIG. 7 illustrates a circuit diagram of a saw-tooth generator as embodied in elements 45, 47, 64 and 65 of FIGS. 4 and 6. Capacitor $C_1$ is charged from a positive voltage source through a resistor $R_1$ and a transistor $T_1$, which is rendered conductive with a positive potential on its base. The charging current is limited by a base resistor $R_2$ of transistor $T_1$, and remains constant so that the voltage on capacitor $C_1$ and on terminal $A_1$ increases slowly and steadily from zero.

Transistors $T_3$ and $T_4$ with the collector resistors $R_3$ and $R_4$ form voltage dividers with resistors $R_5$, $R_6$ or $R_7$ and $R_8$, respectively, connected as a flip-flop circuit.

The emitters of transistors $T_3$ and $T_4$ are connected to a common potential which may be set to a selectable value by means of a voltage divider $R_9$ and variable resistor W.

The base of transistor $T_3$ is connected to capacitors $C_1$ and terminal $A_1$ through a small resistor $R_{12}$. During the initial time period of a saw-tooth wave, $A_1$ has the potential of "zero". Therefore, the transistor $T_3$ is also negative because of its emitter condition. Transistor $T_3$ is also blocked, and its collector is positive and the base of transistor $T_4$ also has so much positive potential through resistors $R_5$ and $R_6$ and transistor $T_4$ is conductive, and current flows through resistor $R_5$. The potential on the collector of transistor $T_4$ is, therefore, low and the base of transistor $T_3$ is then a low voltage condition due to the voltage dividers resistors $R_7$ and $R_8$, and thus transistor $T_3$ is turned off. The voltage divider resistors $R_{10}$ and $R_{11}$ provide a voltage to the base of transistor $T_5$ which is low so that transistor $T_5$ does not conduct.

If the voltage on terminal $A_1$ and on capacitor $C_1$ is increased sufficiently due to the charging operation that it exceeds the pre-set potential on the emitter of transistor $T_2$, transistor $T_3$ will then become conductive when the potential on the collector of the transistor $T_3$ will drop toward "0", and also the potential on the base of transistor $T_4$ will drop toward "0". The transistor $T_4$ will be turned off at once, and its collector potential will rise toward plus voltage, and the base potential on transistor $T_5$ thereby also becomes positive. Transistor $T_5$ becomes conductive, and the capacitor $C_1$ will be discharged so that the potential $A_1$ changes to "0". This "0" potential is supplied to the base of transistor $T_3$ through the small resistor $R_{12}$. Transistor $T_3$ will be turned off again, and the initial state of our example is again achieved in which transistor $T_4$ conducts and transistor $T_5$ is turned off. A direct coupling between $A_1$ and the base of transistor $T_3$ would cause the flip-flop transistors $T_3$ and $T_4$ to reach the "0" position too rapidly, and would block transistor $T_5$ before the capacitor $C_1$ is totally discharged. The timing circuit formed from resistor $R_{12}$ and capacitor $C_2$ is, therefore, utilized, which permits potential $A_1$ and capacitor $C_1$ to become operative only with a small delay on the base of transistor $T_3$ so that the initial state is only restored if the discharge of the capacitor $C_1$ has been terminated.

The saw-tooth generator operates in a self-oscillatory fashion. Its frequency is provided by the size of the capacitance of capacitor $C_1$, by the value of resistance of the resistors $R_1$ and $R_2$, as well as the emitter potential of transistor $T_3$, which, with the aid of the resistor W is adjustable, and which determines the amplitude of the saw-tooth voltage.

At the beginning of our example, it was assumed that the base of the charging transistor $T_1$ has a positive potential. This is the case if because of resistor $R_2$ transistor $T_2$ is blocked, because its collector $K_2$ is connected to the base of transistor $T_1$ through resistor $R_2$. Transistor $T_2$ will be negatively biased and blocked through resistors $R_{13}$ and $R_{14}$ and through its base. This confirms the original assumptions which were made.

The positive voltage connected to terminal $E_g$ and thus a positive voltage is connected to the base of transistor $T_2$ and transistor $T_2$ becomes conductive, the potential on the base of transistor $T_1$ will become negative and transistor $T_1$ will be blocked. The charging operation will therefore be interrupted; however, the capacitor $C_1$ will retain its charge which has been accepted up until that time, and the potential on $A_1$ remains at this value which it had at the moment of blockage. It remains unchanged as long as a positive voltage is connected to terminal $E_g$. If this positive voltage disappears, the charge operation will continue from precisely the same point which existed at the time the interference to said charging operation was initiated. As previously mentioned, this behavior is utilized to fade out the dead periods in the course of recording on a cylinder between the end of a line and the beginning of the next line.

Figure 8:
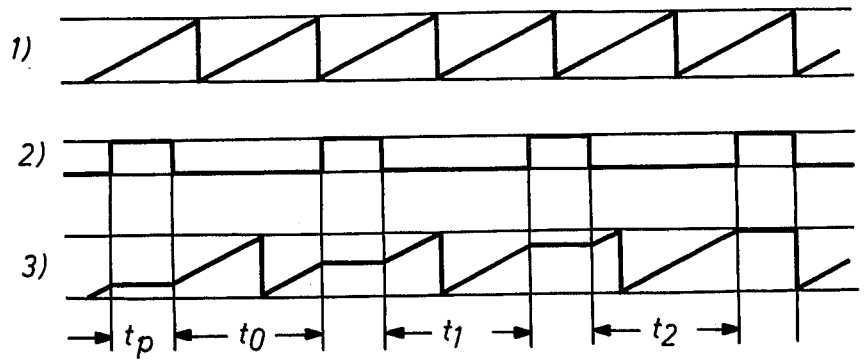
FIG. 8 (1, 2, 3) illustrate the shape of electrical signals occurring in the generator of FIG. 7.

In FIG. 8, curve (1), (2) and (3) illustrate the various functions.

(1) Curve 1 represents the saw-tooth voltage which the saw-tooth generator would apply given an uninterrupted operating mode; i.e., potential "0" on terminal $E_g$.

(2) Curve 2 represents rectangular positive pulses which reach line $A_1$ during the periods between the end of recording of a picture line and the beginning of the following. These pulses are produced by means of marks 47, 48, in FIG. 4 at the end of one and at the beginning of a following picture line.

(3) Curve 3 represents the actual alternating voltage occurring on line A. $t_o, t_1 \ldots t_n$ are the recording phases and $t_p$ are the pause periods which are to be faded out.

FIG. 9 illustrates a circuit diagram for comparator devices 57 and 54 illustrated in FIGS. 4 through 6. In principle, these can be the same, and they differ only in the values of some of the capacitors and resistors which correspond to the desired frequencies of the saw-tooth voltages which are to be used.

Outputs of the generators 47 and 45 are 64 and 75, respectively, are connected to input terminals $E_{g2}$ and $E_{g3}$ through lines 48 and 46, and 69 and 68, respectively. The saw-tooth voltages on terminal $E_{g2}$ supplied from generator 45 or 65, respectively, are conveyed to the base of transistor $T_6$ through a differentiating device formed from a small capacitor $C_3$ and a resistor $R_{21}$. The base of transistor $T_6$ remains unchanged during the uniform increasing cycle of the saw-tooth voltage, since it cannot effectively pass through the capacitor $C_3$ when there are only small time varying voltages.

Transistors $T_6$ amd $T_7$ comprises a flip-flop circuit, together with the resistors $R_{17}$ through $R_{23}$. This flip-flop is nonsymmetrical, due to the voltages applied by the voltage dividers of the coupling resistors $R_{20}$, $R_{21}$, $R_{22}$ and $R_{23}$, respectively, and the flip-flop circuit will automatically pass to a specific rest state. In the rest state, transistor $T_6$ will be blocked, and transistor $T_7$ will conduct. Therefore, a low potential will be connected to the collector of transistor $T_7$. The base of transistor $T_8$ will have a negative potential due to the voltage divider formed by resistors $R_{24}$ and $R_{25}$, and transistor $T_8$ will be blocked. The saw-tooth voltage on line $E_{g3}$, therefore, will not pass through transistor $T_8$. At the end of a period, a positive pulse is derived from the flip-flop voltage of the saw-tooth voltage on line $E_{g2}$, which positive pulse reaches the base of transistor $T_6$ through capacitors $C_3$. Transistor $T_6$ becomes conductive for a short period of time during the impulse period. A current pulse flows through resistor $R_{19}$ and the potential on the collector of transistor $T_6$ drops accordingly. The negative voltage reaches the base of transistor $T_7$ through the voltage divider formed by resistors $R_{22}$ and $R_{23}$ when the voltage on the base approaches the minus value. A positive voltage pulse appears on the collector of transistor $T_7$ from which a voltage division approaching minus through resistors $R_{24}$ and $R_{25}$, a positive risidual pulse remains on the base of transistor $T_8$. This causes transistor $T_8$ to become conductive for a short period of time. The relatively small capacitor $C_4$ receives voltage which is connected to line $E_{g3}$ at that moment; in other words, an instantaneous value of the saw-tooth voltage applied by generator 47 or 64, respectively, which is available on terminal $A_2$. Directly following this, the flip-flop formed by transistors $T_6$ and $T_7$ return to their stable rest position, whereby transistor $T_8$ is blocked again. However, capacitor $C_4$ holds this voltage sample and continues to be stable while the voltage on line $E_{g3}$ follows the course of the saw-tooth curve and continues to increase.

Finally, the saw-tooth voltage also reaches the flip-flop point on line $E_{g3}$, and due to the sudden variation in voltage, a pulse is obtained by means of differentiation through capacitor $C_6$ and resistor $R_{31}$ which forces the flip-flop formed from transistors $T_9$ and $T_{10}$ and the resistors $R_{27}$ through $R_{33}$ out of the stable position through the base of transistor $T_9$. Transistor $T_{10}$ which up to this point has been conducting is thereby blocked, and the potential on its collector of transistor $T_{10}$ becomes positive.

A positive partial voltage reaches the base of transistor $T_{11}$ through resistors $R_{34}$ and $R_{35}$ and causes it to become conductive. Capacitor $C_4$ is therefore shorted out, and its charge disappears. Like the flip-flop, consisting of transistors $T_6$ and $T_7$, this flip-flop, consisting of transistors $T_{10}$ $T_{11}$, is also non-symmmetrical, and, directly thereafter, returns to its stable initial position. In this time period, in which a new phase of the saw-tooth voltage on line $E_{g3}$ begins, capacitor $C_4$ has the potential "0".

The voltage leap occurring on the collector of transistor $T_{10}$ is differentiated via a small capacitor $C_5$, and reaches terminal $A_3$ as a pulse. It is used in order to supply the counter registers 62 or 83, respectively via lines 63 or 84, respectively of FIG. 4 or FIG. 6, respectively.

Figure 10:
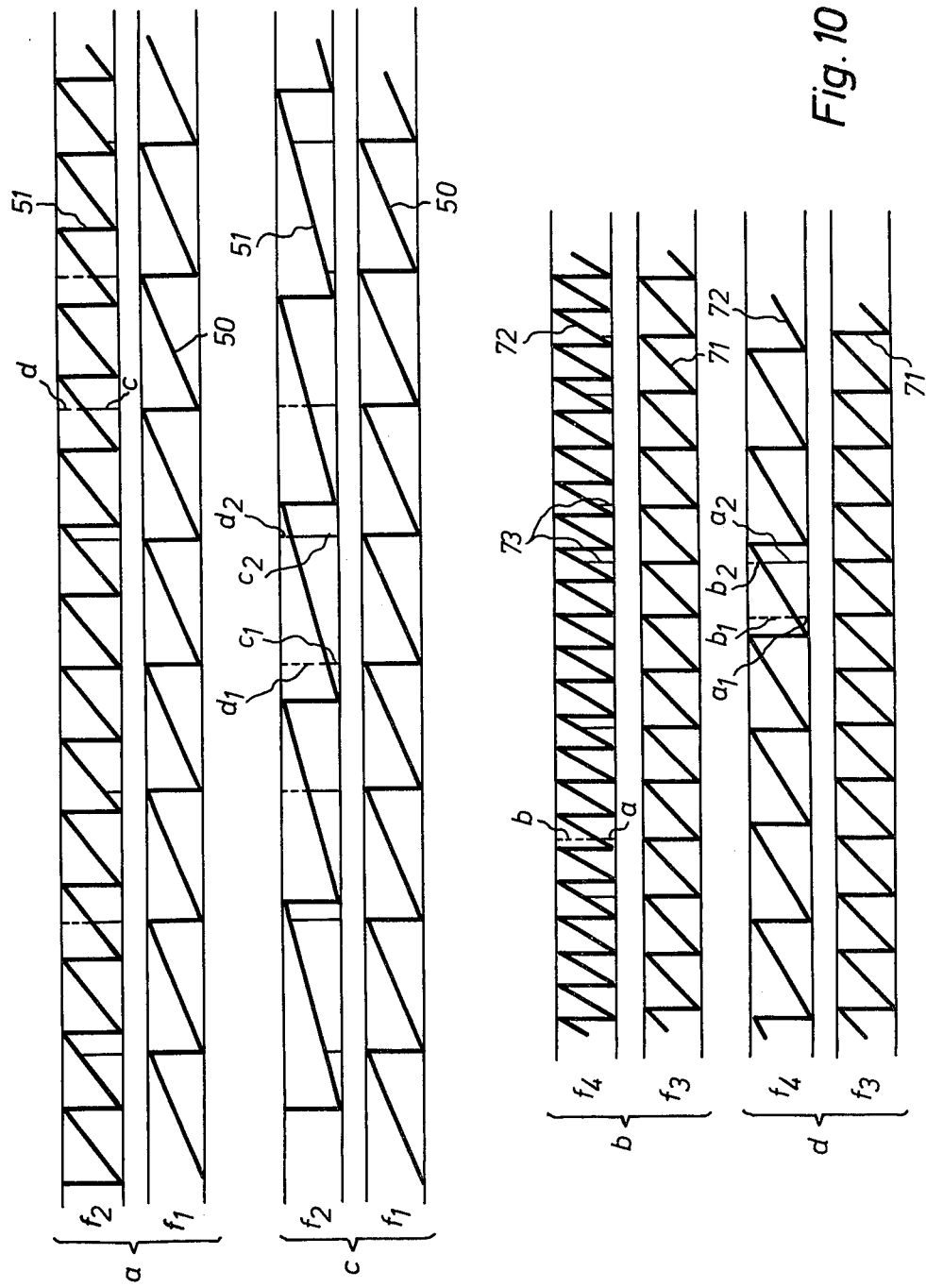
FIG. 10 $a$, $b$, $c$ and $d$ illustrate various wave forms occurring in the invention.

FIG. 10 illustrates again in detail the curve paths of circuits 49 and 50 as well as 70 and 71 of FIGS. 4 and 6. Curves (*a*) illustrate the case in which a reduction occurs; [where] $f_1:f_2<1$ is valid. The magnitudes obtained here serve the purpose of recording plotting picture line in the reduction process. Curves (*b*) likewise apply to the reduction wherein $f_3:f_4<1$. Parameters *a* and *b* which have been obtained are required for calculating the raster points.

The case of enlargement is illustrated by curve paths (*c*) and (*d*). Curve path (*c*), for which $f_1:f_2>1$ provides the parameters for the picture line recording plotting curve path (*d*), for which $f_3:f_4>1$, provides the parameters for the recording of raster points.

I claim as my invention:

1. The method for the rastered reproduction of halftone pictures with changes in the picture-element break-up process during transfer from the original to the reproduction with the aid of electronically stored recording data in a randomly variable scale, the steps include:
   scanning the picture according to the finest scale necessary,
   encoding and digitally storing the ascertained values, reproducing a picture comprising the following steps:
   removing the gray scale value data of four corner points of a mesh square of the original raster network of the model picture from the memory,
   locating one or more picture elements of the new raster network for the reproduced, picture which is to be recorded,
   calculating by means of linear interpolation the data to be recorded according to the picture scanning elements,
   said calculating is done according to the following formula:

$$N = \frac{\frac{Ab + Ba}{aa + b} \cdot d + \frac{Cb + Da}{a + b} \cdot c}{c + d}.$$

where N is the gray scale value of the new picture element, A, B, C, D are the gray scale values of the corner points of the mesh square of the original raster network in which the new picture element is located, and a, b, c, d are the coordinates of the point from the vertical and horizontal lines of the network square in which the point is located.

2. The method as specified in claim 1, wherein linear interpolation is carried out by means of an enlargement or reduction-scale which corresponds to the desired compression or expansion of the recording raster as compared with the scanning raster while maintaining the reproduction scale, and that enlargement or reduction during recording is made reversible.

3. The method of claim 1 wherein when an altered reproduction scale is desired, the linear interpolation is carried out with an enlargement or reduction which is selected to be greater or smaller by an amount which corresponds to the required compression or expansion of the recording raster as compared with the scanning raster, and the amount of the enlargement or reduction during recording, which can be traced back to the raster compression or raster expansion, is made reversible.

4. The method of claim 3 wherein the amount of enlargement or reduction during linear interpolation, which can be traced back to the raster constriction or expansion, is made reversible by the choice of the intervals of the recorded picture elements in the direction of and transversely to the direction of recording.

5. The method of claim 4 wherein for enlargement processes by means of multiple use of the formula corresponding to the enlargement factor, the data for recording are obtained from more picture elements than the number of stored points of the model picture.

6. The method of claim 5 wherein in order to include greater numbers of parameters *b, c, a* and *d,* correspondingly more registers are provided, and in addition shift registers are provided which store the data ready for the computer, while the calculation of the parameters of the following picture element is beginning.

7. The method of claim 1, wherein the parameters *c, d, a* and *b* of the formula in claim 1 are obtained with four sawtooth generators having the frequencies of $f_1$, $f_2$, $f_3$ and $f_4$ and two of these generators serve to control the image line recording, and the other two generators serve to control the recording of the picture elements, and in addition, at those times at which the saw-tooth voltages of frequencies $f_1$ or $f_3$ flip, conditions voltage samples are taken from the respective assigned saw-tooth voltages $f_2$ or $f_4$, respectively, which represent scales for the parameters *c* and *b*, and the amplitudes of the saw-tooth voltage $f_2$ correspond to the intervals of the horizontal image lines of a model picture network I, and the amplitudes of saw-tooth voltage $f_4$ correspond to the intervals between the picture elements on these image lines and the parameters $d$ or $b$, respectively, are determined as differential values from the amplitudes of voltages $f_2$ and $c$, or voltages $f_4$ and $a$, respectively.

8. The method of claim 7 wherein the analog values of $c$, $d$, $a$ and $b$ are binarily coded and stored in a plurality of registers.

9. The method of claim 8 wherein the ratios of the frequencies $f_1 : f_2$ and $f_2 : f_4$, respectively, of said two saw-tooth generators, or generators, respectively, determines the change in scale of the reproduced picture as compared with the model picture, whereby, preferably the ratio is $f_1 : f_2 = f_3 : f_4$.

10. The method as specified in claim 9 wherein in the case of picture reduction, the ratio $f_1 : f_2 = f_3 : f_4 <$ than 1, and, in the case of enlargement, the ratio $f_1 : f_2 = f_3 : f_4 > 1$.

11. The method of claim 10, wherein $f_1$ is equal to the number of focal lines per second which are to be recorded, and $f_3$ is equal to the number of picture elements per second which are to be recorded.

12. The method of claim 11 wherein gaps in the recording between the end of a focal line and the beginning of the following line are faded out by means of a pair of shut down generators having frequencies $f_1$ and $f_2$, whereby the other of said generators begins a new voltage phase at zero with each new focal line, and the other generator continues to operate from the same voltage amplitude at which it was set at the time of the shut-down.

13. The method as specified in claim 11 wherein the shutting down of said pair of generators takes place by interrupting the charging currents of capacitors in their oscillatory circuits.

14. A circuit arrangement for the purpose of carrying out rastered reproduction of half-tone pictures comprising a saw-tooth generator, having a time circuit formed from a first resistor, a first transistor, and a first capacitor, a second transistor which has a base operable from a terminal $E_g$, and whose collector is coupled to the base of said first transistor $T_1$ through a second resistor, a monostabile flip flop switch formed from third and fourth transistors and third through eighth coupling resistors, the emitters of said third and fourth transistors of said monostabile flip flop switch being jointly maintained at an adjustable preset voltage potential by means of a regulating potentiometer and variable resistor and which flips into the other position as soon as the potential on the base of said third transistor exceeds said preset potential, a fifth transistor mounted parallel to said first capacitor and blocked in the rest state, and becomes conductive rapidly and discharges said first capacitor as soon as the voltage on the base of said third transistor exceeds the preset emitter voltage for a delay element formed from another resistor and a second capacitor which permits the voltage value on said second capacitor which has jumped to "zero", to reach the base of said third transistor with a small delay.

15. A circuit arrangement for carrying out the method in claim 14, wherein a monostabile flip flop unit formed from sixth and third transistors and seventeenth through 23rd resistors and the rest position of said monostabile flip flop unit, said sixth transistor is blocked and the seventh transistor conducts whereby the potential on the collector of the seventh transistor sinks toward "zero", due to a voltage divider consisting 24th and 25th resistors by means of which the base of an eighth transistor is negatively biased and said eighth transistor is blocked, a differentiating element formed from a third capacitor and 21st resistor which differentiate to form a pulse occurring during flipping of the voltage from the saw-tooth voltage $f_1$ or $f_3$, respectively which is connected to the base of said sixth transistor, and which forces the flip flop in the shifted position and makes said sixth transistor conductive and blocks said seventh transistor, whereby the collector and component voltage become positive, so that the eighth transistor becomes conductive for a short period of time, and a saw-tooth voltage $f_2$ or $f_4$, respectively, connected to a terminal can reach the fourth capacitor, which receives and stores a charge at the instantaneous voltage connected to said terminal at that time, a second monostabile flip flop unit formed from ninth and tenth transistors and 27th to 33rd resistors and which, in a state of rest, the tenth transistor conducts and its collector has a small potentional, an eleventh transistor mounted in parallel to said fourth capacitor, the base of said eleventh transistor being negatively biased by means of a voltage divider consisting 34th and 35 resistors mounted, between the collector of said tenth transistor, and which is negatively formed, and said eleventh transistor is therefore blocked, and can therefore not remove the charge of said fourth capacitor, a coupling sixth capacitor, which forms a differentiating element with a 31st resistor such that, of the saw-tooth voltages $f_2$ or $f_4$, respectively connected to said terminal, only the flip pulse reaches the base, of the ninth transistor and the flip flop unit switches for a short period of time, whereby a positive voltage pulse occurs on the collector of said tenth transistor which, as a positive pulse, makes said eleventh transistor conductive and whereby the charge of said fourth capacitor is quenched.

* * * * *